(12) United States Patent
Hsiao et al.

(10) Patent No.: US 12,186,997 B2
(45) Date of Patent: Jan. 7, 2025

(54) METHOD FOR MANUFACTURING A COMPOSITE STRUCTURE

(71) Applicant: GIANT GLORY INTERNATIONAL LIMITED, Apia (WS)

(72) Inventors: Cheng-Ping Hsiao, Changzhi Township (TW); Yi-Feng Huang, New Taipei (TW)

(73) Assignee: GIANT GLORY INTERNATIONAL LIMITED, Apia (WS)

( * ) Notice: Subject to any disclaimer, the term of this patent is extended or adjusted under 35 U.S.C. 154(b) by 720 days.

(21) Appl. No.: 17/401,115

(22) Filed: Aug. 12, 2021

(65) Prior Publication Data

US 2022/0371287 A1 Nov. 24, 2022

(30) Foreign Application Priority Data

May 18, 2021 (TW) .................. 110117852

(51) Int. Cl.
  *B29C 69/02* (2006.01)
  *B29C 45/14* (2006.01)
  *B29C 69/00* (2006.01)

(52) U.S. Cl.
  CPC ........ *B29C 69/001* (2013.01); *B29C 45/1418* (2013.01); *B29C 69/02* (2013.01); *B29C 2045/14868* (2013.01); *B29C 2793/0081* (2013.01)

(58) Field of Classification Search
  CPC .......... B29C 2793/0081; B29C 69/001; B29C 69/02; B29C 45/1418; B29C 2045/14868
  See application file for complete search history.

(56) References Cited

U.S. PATENT DOCUMENTS

2009/0035589 A1* 2/2009 Lee ................... B29C 45/14311
  428/457
2014/0335634 A1* 11/2014 Kasai ................. B29C 37/0075
  526/253

(Continued)

FOREIGN PATENT DOCUMENTS

CN 108724550 A 11/2018
TW 309464 B 7/1997
TW 201414597 A 4/2014

OTHER PUBLICATIONS

Search Report appended to an Office Action, which was issued to Taiwanese counterpart Application No. 110117852 by the TIPO on Jan. 7, 2022 with an English translation thereof (2 pages).

*Primary Examiner* — Alison L Hindenlang
*Assistant Examiner* — Debjani Roy
(74) *Attorney, Agent, or Firm* — HSML P.C.

(57) ABSTRACT

A method for manufacturing a composite structure having first and second structural members includes the steps of: (A) placing a plate in a forming mold having a first molding member, and a second molding member with an injection hole; (B) moving the first molding member toward the second molding member to stamp and deform the plate; (C) injecting a molten substrate onto the plate via the injection hole to stamp and deform again the plate so as to form the first structural member; (D) removing an assembly of the first structural member and a solidified substrate from the first molding member; and (E) removing an excess part of the solidified substrate to form the second structural member.

7 Claims, 5 Drawing Sheets

(56) References Cited

U.S. PATENT DOCUMENTS

2016/0089850 A1* 3/2016 Hamada ................ B44C 5/043
    156/268
2016/0189986 A1* 6/2016 Kasai ..................... B32B 7/06
    428/141

* cited by examiner

100

100

METHOD FOR MANUFACTURING A COMPOSITE STRUCTURE

CROSS-REFERENCE TO RELATED APPLICATION

This application claims priority of Taiwanese Invention Patent Application No. 110117852, filed on May 18, 2021.

FIELD

The disclosure relates to a method for manufacturing a composite structure, and more particularly to a method for manufacturing a composite structure by stamping.

BACKGROUND

Conventionally, a composite structure is made by first subjecting a thin plate to a plurality of stamping processes so as to form an external structure of the composite structure, followed by an injection molding process to form an internal structure of the composite structure. However, this conventional method of making the composite structure requires a plurality of sets of stamping molds of different sizes to sequentially process the thin plate, thereby making the manufacturing process of the composite structure long and complicated. In addition, a variety of stamping molds must be developed which lead to increase in the manufacturing cost thereof. Furthermore, in the conventional method, an interior angle of the composite structure is limited and cannot be less than 90° so as to allow release of the external structure formed from the stamping mold used.

SUMMARY

Therefore, an object of the present disclosure is to provide a method for manufacturing a composite structure that can alleviate at least one of the drawbacks of the prior art.

Accordingly, the method of this disclosure includes the steps of:
(A) placing a plate in a forming mold after the forming mold is heated to a predetermined temperature, the forming mold including a first molding member having a concave portion, and a second molding member that is movable toward and away from the first molding member, the concave portion having two opposite curved side surfaces and a bottom surface between the two opposite curved side surfaces, the second molding member having a convex portion and an injection hole extending through the convex portion from an outer surface thereof, the plate being supported on the first molding member and having an abutment surface facing the concave portion, and a bonding surface that is opposite to the abutment surface and that faces the convex portion;
(B) moving the second molding member toward the first molding member to stamp and deform a central portion of the plate into the concave portion through the convex portion;
(C) injecting a substrate that is in a molten state onto the bonding surface of the plate via the injection hole to stamp and deform again the plate such that the abutment surface at the central portion of the plate abuts against the bottom surface of the concave portion, and two opposite side portions of the plate are pressed to abut against the two opposite curved side surfaces of the concave portion, thereby forming the plate into the first structural member;
(D) moving the second molding member away from the first molding member after the molten state substrate is cooled and solidified and is bonded to the first structural member, and then removing an assembly of the first structural member and the solidified substrate from the first molding member; and
(E) removing an excess part of the solidified substrate to form the solidified substrate into the second structural member, thereby obtaining the composite structure.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
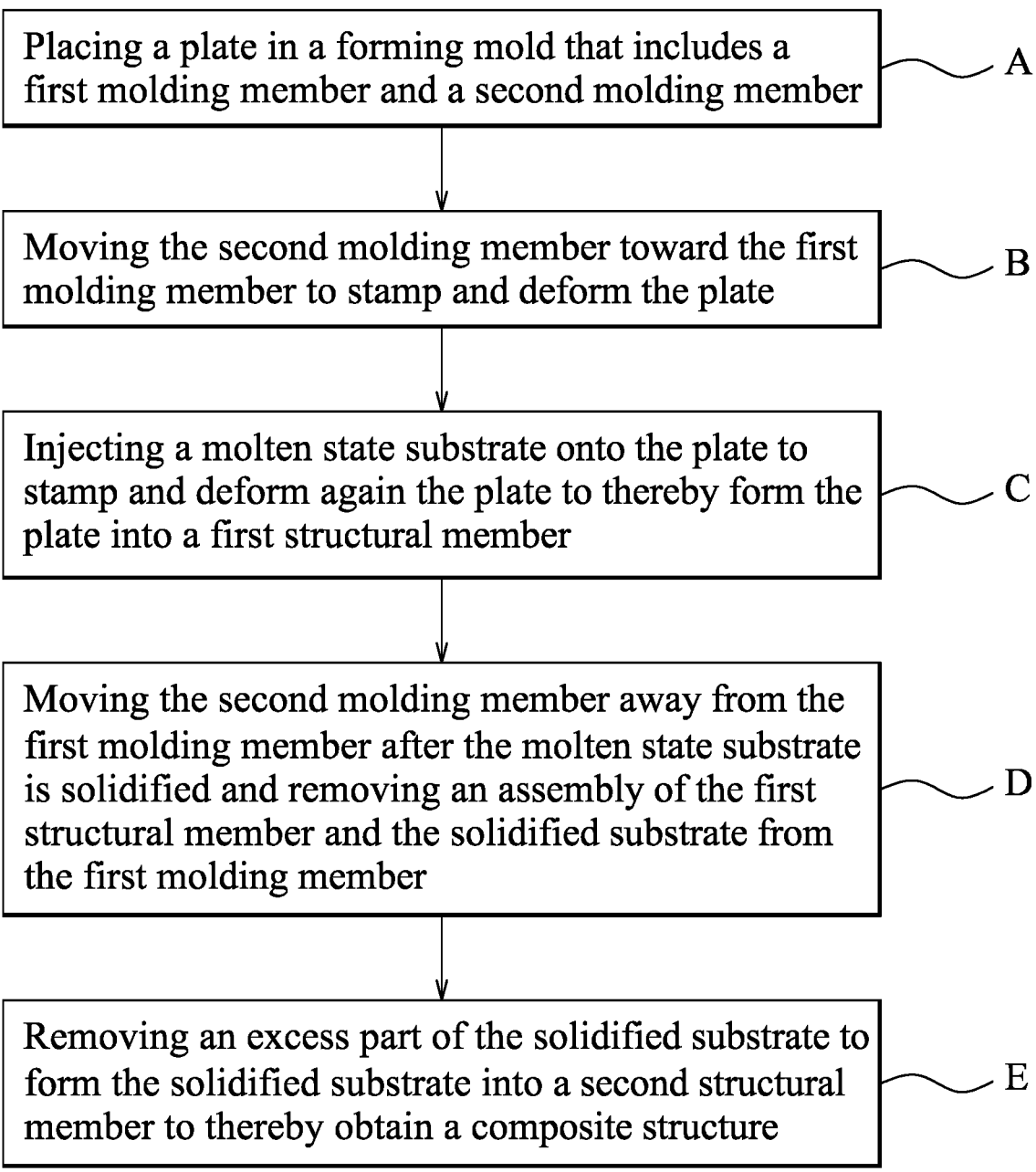
FIG. 1 is a flow chart illustrating the steps involved in a method for manufacturing a composite structure according to an embodiment of the present disclosure.
Figure 6:
FIG. 6 is a schematic view illustrating step (E) of the embodiment, in which an excess part of the solidified substrate is removed to form the solidified substrate into a second structural member to thereby obtain the composite structure of this disclosure.

Referring to FIG. 1, a method for manufacturing a composite structure 100 (see FIGS. 6 and 7) according to an embodiment of the present disclosure includes steps (A) to (E). The composite structure 100 may be applied to a casing of a notebook computer. Referring to FIG. 6, the composite structure 100 is made of two different materials, and includes a first structural member 2' and a second structural member 4' bonded to each other. In this embodiment, the first structural member 2' is made of metal, e.g., aluminum, and the second structural member 4' is made of plastic. However, the first structural member 2' may be made of other malleable solid materials, and the second structural member 4' may be made of another metal, e.g., magnesium, but are not limited thereto. That is, the method of this disclosure is suitable for making a double layered structure made of different materials or made of the same material but by two different forming processes, such as stamping and injection molding. For instance, both the first and second structural members 2', 4' are made of aluminum (or magnesium). The composite structure 100 obtained from two different forming processes has a thickness greater than that of a single layered structure obtained from a conventional stamping process, so that the overall thickness of the composite structure 100 is not limited by the stamping process.

The steps involved in the method of this disclosure will be described in detail below.

Figure 2:
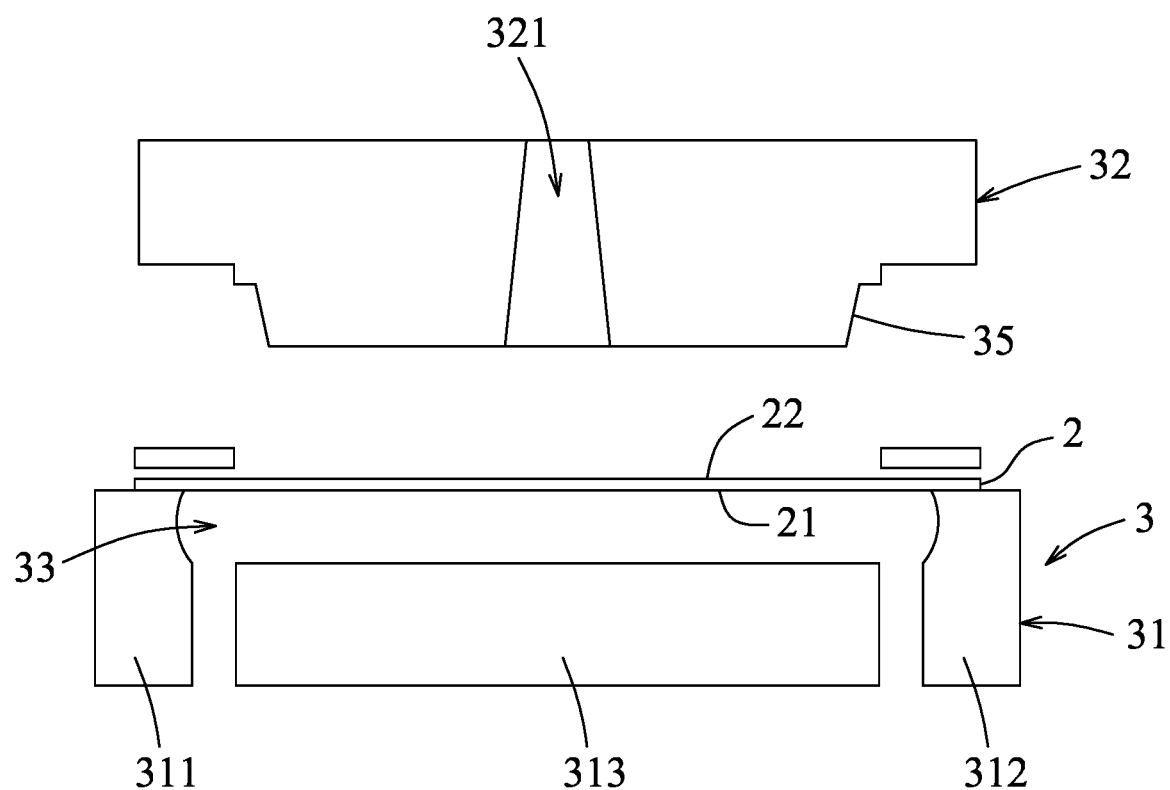
FIG. 2 is a schematic view illustrating step (A) of the embodiment, in which a plate is placed in a forming mold and is supported on a first molding member thereof.
Figure 7:
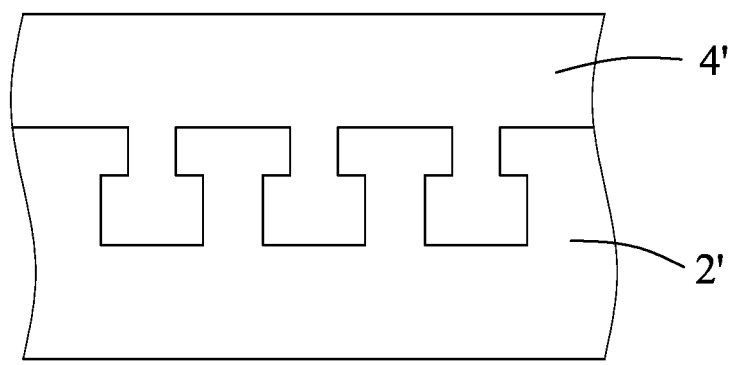
FIG. 7 is an enlarged schematic view of an encircled portion of FIG. 6, illustrating a connection relationship between the first and second structural members of the composite structure.

Firstly and prior to performing step (A), referring to FIGS. 2, 6 and 7, in combination with FIG. 1, a plate 2 used for making the first structural member 2' is subjected to a surface treatment, so that a bonding surface 22 of the plate 2 is formed with a concave-convex structure to enhance bonding between the plate 2 and another component of different material. The surface treatment may be a chemical etching process, so that the concave-convex structure of the bonding surface 22 is a micro-scale or a nano-scale structure, and the plate 2 can be bonded to another component made of plastic. The surface treatment may also be a cutting process controlled by Computer Numerical Control (CNC) machine, so that the concave-convex structure of the bonding surface 22 includes a plurality of alternately arranged protrusions and grooves (see FIG. 7), and the plate 2 can be bonded to another component made of a metallic material. As shown in FIG. 7, each of the protrusions has a T-shaped cross section, and each of the grooves has an inverted T-shaped cross section. In this embodiment, the another component bonded to the plate 2 is exemplified as a solidified substrate 4.

Next, a forming mold 3 is heated to a predetermined temperature, and the surface-treated plate 2 is heated to a temperature that is greater than or equal to the predetermined temperature of the forming mold 3. This is to increase the malleability of the plate 2 and to maintain the temperature of the forming mold 3 in the subsequent steps when the forming mold 3 is closed. That is, the temperature of the forming mold 3 will not be affected by heat conduction of the plate 2 causing its temperature to decrease.

Steps (A) to (E) are then subsequently performed.

Referring to FIG. 2, in step (A), the plate 2 that is heated and surface-treated is placed in the heated forming mold 3. The forming mold 3 includes a first molding member 31, and a second molding member 32 that is movable toward and away from the first molding member 31. The first molding member 31 includes a left component 311, a right component 312 and a middle component 313 that are movable toward each other when the second molding member 32 is moved toward the first molding member 31 so as to close the forming mold 3. The left component 311, the right component 312 and the middle component 313 cooperatively define a concave portion 33 when moved toward each other. The concave portion 33 has two opposite curved side surfaces 331 and a bottom surface 332 between the two opposite curved side surfaces 331. The second molding member 32 has a convex portion 35 and an injection hole 321 extending through the convex portion 35 from an outer surface thereof. The first molding member 31 serves as a female mold, and the second molding member 32 serves as a male mold. The plate 2 is supported on the left and right components 311, 312 of the first molding member 31. An abutment surface 21 of the plate 2, which is opposite to the bonding surface 22 thereof, faces the concave portion 33, while the bonding surface 22 faces the convex portion 35.

Figure 3:
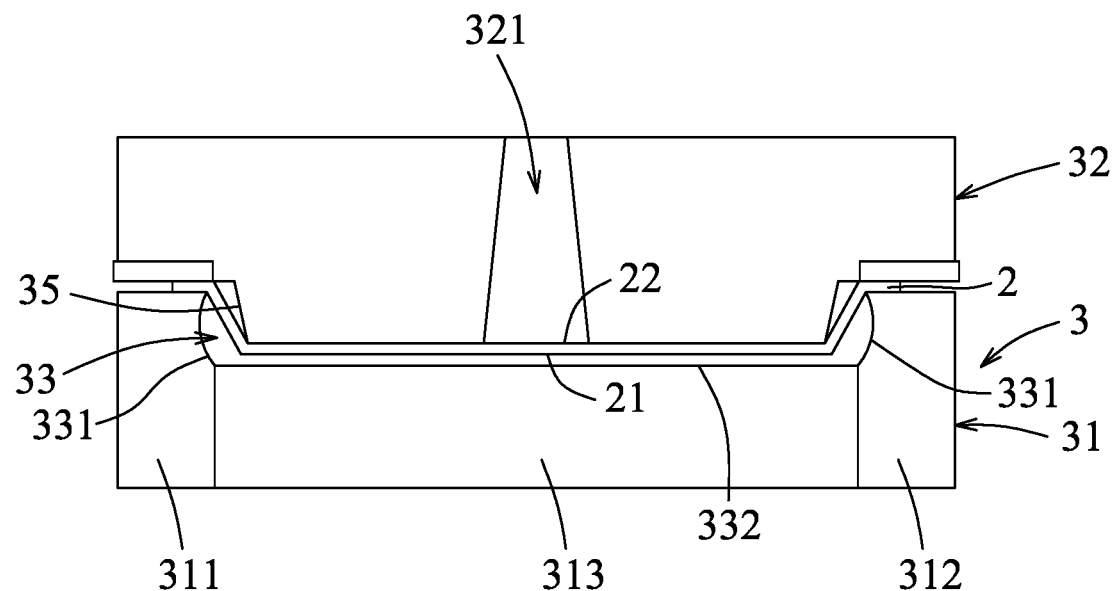
FIG. 3 is a schematic view illustrating step (B) of the embodiment, in which a second molding member of the forming mold is moved toward the first molding member to stamp and deform the plate.

Referring to FIG. 3, in step (B), the second molding member 32 is moved toward the first molding member 31 to close the forming mold 3 and to stamp and deform a central portion of the plate 2 into the concave portion 33 through the convex portion 35. In this embodiment, the plate 2 is stamped and deformed by the convex portion 35 of the second molding member 32, but is not limited thereto. In other embodiments, the plate 2 may be stamped by the first molding member 31.

Figure 4:
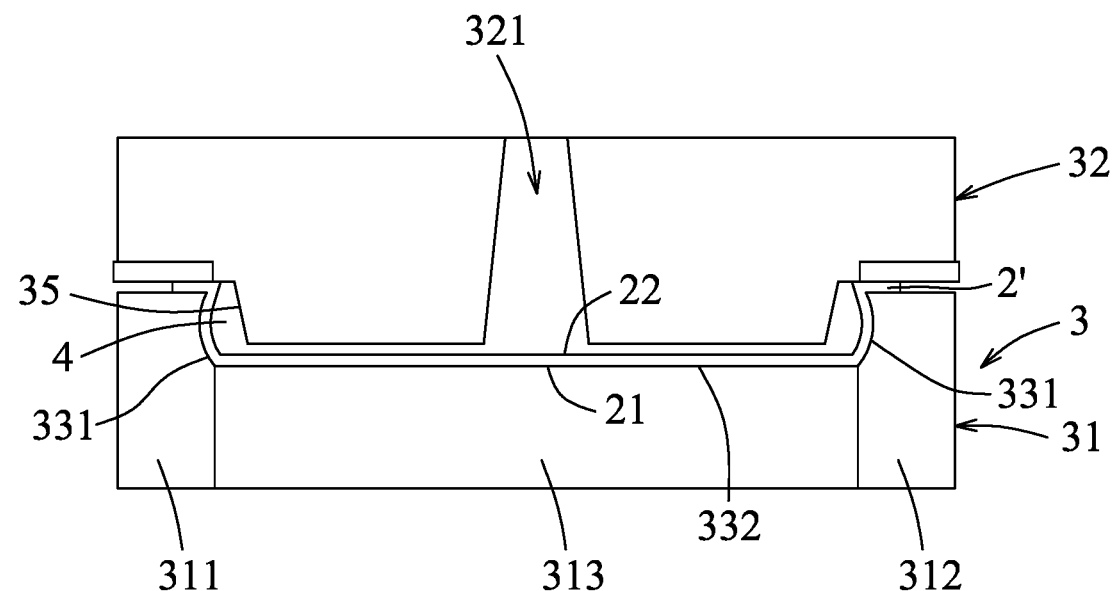
FIG. 4 is a schematic view illustrating step (C) of the embodiment, in which a molten state substrate is injected onto a bonding surface of the plate to stamp and deform again the plate.

Referring to FIGS. 3 and 4, in step (C), a substrate 4 that is in a molten state is injected onto the bonding surface 22 of the plate 2 via the injection hole 321. The plate 2 is stamped and deformed again by the molten state substrate 4, such that the abutment surface 21 at the central portion of the plate 2 abuts against the bottom surface 332 of the concave portion 33, and two opposite side portions of the plate 2 are pressed to abut against the two opposite curved side surfaces 331 of the concave portion 33, thereby forming the plate 2 into the first structural member 2', as shown in FIG. 4. The first structural member 2' is shaped similar to the curved side surfaces 331 and the bottom surface 332 of the concave portion 33.

Figure 5:
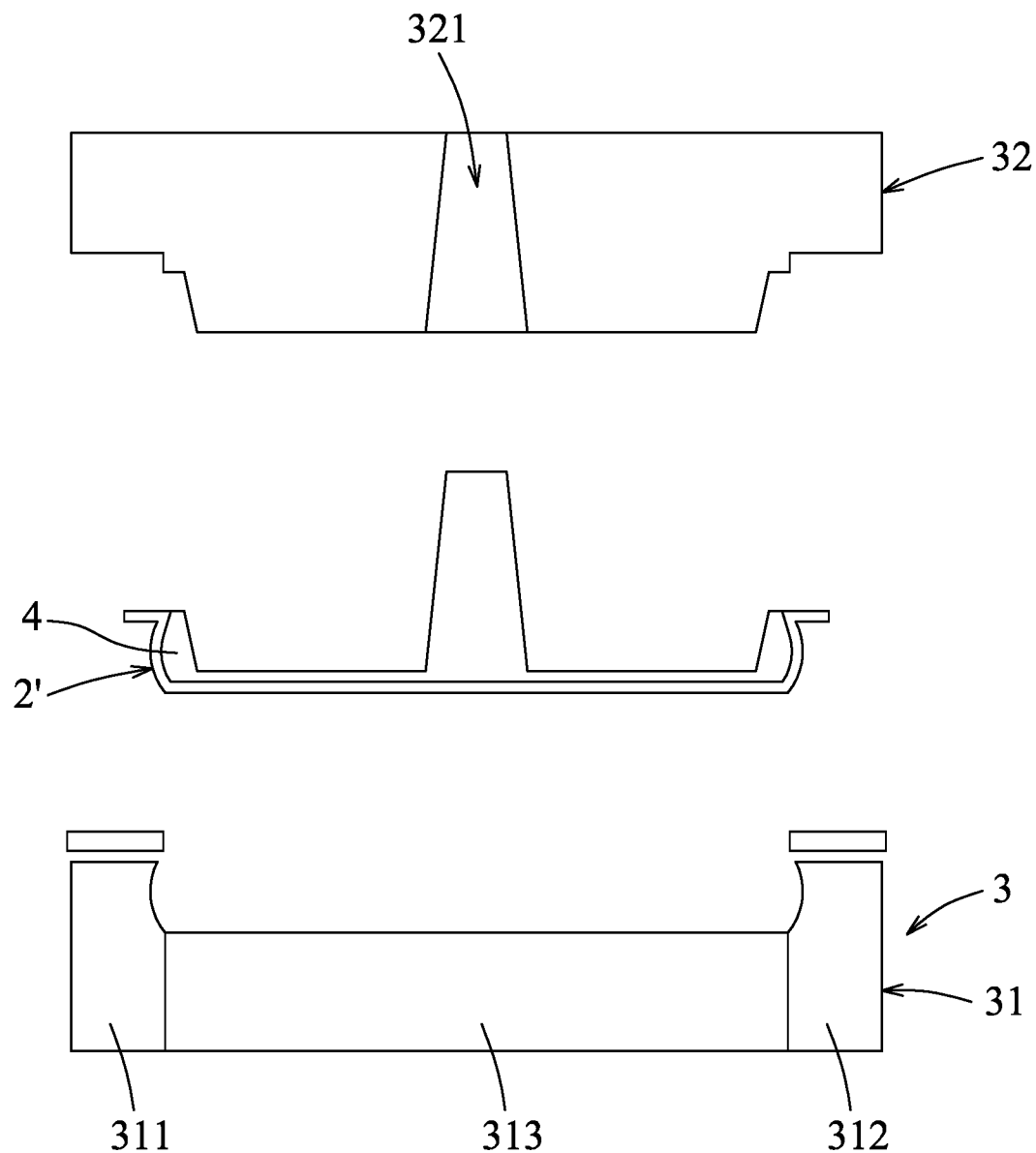
FIG. 5 is a schematic view illustrating step (D) of the embodiment, in which the second molding member is moved away from the first molding member, and an assembly of a first structural member and a solidified substrate is removed from the first molding member.

Referring to FIG. 5, in step (D), the second molding member 32 is moved away from the first molding member 31 after the molten state substrate 4 is cooled and solidified and is bonded to the first structural member 2', and then an assembly of the first structural member 2' and the solidified substrate 4 is removed from the first molding member 31.

Referring to FIGS. 5 and 6, in step (E), an excess part, that is, a protruded part, of the solidified substrate 4 is removed to form the solidified substrate 4 into the second structural member 4', thereby obtaining the composite structure 100. In this embodiment, the excess part of the solidified substrate 4 is removed by a cutting process, such as a cutting process controlled by CNC machine, to shape the solidified substrate 4 into the second structural member 4'. Through this, the second structural member 4' can be made to form structures like grooves or screw holes according to different usage so as to facilitate the subsequent use of the composite structure 100 as a material in the manufacture of a product, such as the casing of the notebook computer (not shown). That is, the composite structure 100 can be assembled with other component through the structural design of the second structural member 4'.

In step (B), when the second molding member 32 is moved toward the first molding member 31, the left component 311, the right component 312 and the middle component 313 of the first molding member 31 are moved respectively from left, right and bottom directions toward the second molding member 32. On the contrary, when the second molding member 32 is moved away from the first molding member 31, the left component 311, the right component 312 and the middle component 313 are moved respectively from the left, right and bottom directions away from the second molding member 32. As such, the first structural member 2' whose interior angle is less than 90° may be easily removed from the first molding member 31 and is not restricted by the structure of the first molding member 31.

It is worth to mention herein that the composite structure 100 manufactured by steps (A) to (E) of the method according to this disclosure may be further subjected to a surface treatment, such as anodizing, spray painting or electrodeposition (ED), so that the composite structure 100 may be used as a material in the manufacture of a product.

In summary, in the method according to this disclosure, the plate 2 is subjected to a first stamping process by the closing of the forming mold 3 in step (B), followed by a second stamping process by the injection of the molten state substrate 4 in step (C) so as to form into the first structural member 2'. There is no need to perform a forming processing of the plate 2 before the injection molding process, so that the method of this disclosure is simple and easy to implement. Further, in both steps (B) and (C), the forming mold 3 is used to perform stamping on the plate 2, so that only one set of the forming mold 3 is required to accomplish the two stamping processes of the method of this disclosure. As such, the number of stamping mold can be reduced, and thus the manufacturing cost as well. Moreover, the interior angle of the first structural member 2' is formed by stamping of the molten state substrate 4, so that the first structural member 2' is not limited by the structure of the second molding member 32 and can be easily removed therefrom. Thus, the object of this disclosure can indeed be achieved.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A method for manufacturing a composite structure which includes a first structural member and a second structural member bonded to each other, the method comprising the steps of:
   (A) placing a plate in a forming mold after the forming mold is heated to a predetermined temperature, the forming mold including a first molding member having a concave portion, and a second molding member that is movable toward and away from the first molding member, the concave portion having two opposite curved side surfaces and a bottom surface between the two opposite curved side surfaces, the second molding member having a convex portion and an injection hole extending through the convex portion from an outer surface thereof, the plate being supported on the first molding member and having an abutment surface facing the concave portion, and a bonding surface that is opposite to the abutment surface and that faces the convex portion;
   (B) moving the second molding member toward the first molding member to stamp and deform a central portion of the plate into the concave portion through the convex portion;
   (C) injecting a substrate that is in a molten state onto the bonding surface of the plate via the injection hole to stamp and deform again the plate such that the abutment surface at the central portion of the plate abuts against the bottom surface of the concave portion, and two opposite side portions of the plate are pressed to abut against the two opposite curved side surfaces of the concave portion, thereby forming the plate into the first structural member;
   (D) moving the second molding member away from the first molding member after the molten state substrate is cooled and solidified and is bonded to the first structural member, and then removing an assembly of the first structural member and the solidified substrate from the first molding member; and
   (E) removing an excess part of the solidified substrate to form the solidified substrate into the second structural member, thereby obtaining the composite structure.

2. The method of claim 1, wherein, before step (A), the plate is subjected to a surface treatment to form a concave-convex structure on the bonding surface thereof so as to enhance bonding between the plate and the substrate.

3. The method of claim 2, wherein the substrate is made of a plastic material, the surface treatment is a chemical etching process, and the concave-convex structure is one of a micro-scale and a nano-scale structure.

4. The method of claim 2, wherein the substrate is made of a metallic material, the surface treatment is a cutting process, and the concave-convex structure includes a plurality of alternately arranged protrusions and grooves.

5. The method of claim 4, wherein each of the protrusions has a T-shaped cross section, and each of the grooves has an inverted T-shaped cross section.

6. The method of claim 1, wherein in step (A), the plate is first heated before being placed in the forming mold, and the temperature of the plate being greater than or equal to the predetermined temperature of the forming mold.

7. The method of claim 1, wherein in step (E), the excess part of the solidified substrate is removed by a cutting process.

* * * * *